(12) United States Patent
Kim et al.

(10) Patent No.: US 8,379,176 B2
(45) Date of Patent: Feb. 19, 2013

(54) LIQUID CRYSTAL DISPLAY AND METHOD OF MANUFACTURING THE SAME

(75) Inventors: Su Jeong Kim, Seoul (KR); Hoon Kim, Ansan-si (KR); Jae Hoon Jung, Incheon (KR); Joo Seok Yeom, Seoul (KR); Ki Chul Shin, Asan-si (KR); Ho Kil Oh, Asan-si (KR)

(73) Assignee: Samsung Display Co., Ltd. (KR)

( * ) Notice: Subject to any disclaimer, the term of this patent is extended or adjusted under 35 U.S.C. 154(b) by 125 days.

(21) Appl. No.: 13/086,072

(22) Filed: Apr. 13, 2011

(65) Prior Publication Data

US 2012/0162559 A1 Jun. 28, 2012

(30) Foreign Application Priority Data

Dec. 28, 2010 (KR) .................. 10-2010-0136967

(51) Int. Cl.
*G02F 1/1343* (2006.01)
(52) U.S. Cl. .................... 349/142; 349/129
(58) Field of Classification Search .......... 349/129, 349/142
See application file for complete search history.

(56) References Cited

U.S. PATENT DOCUMENTS

| | | |
|---|---|---|
| 6,466,290 B2 | 10/2002 | Kim et al. |
| 6,642,985 B2 | 11/2003 | Kim et al. |
| 7,256,852 B2 | 8/2007 | Ono et al. |
| 7,486,366 B2 | 2/2009 | Kataoka et al. |
| 7,633,589 B2 | 12/2009 | Choi et al. |
| 2009/0073367 A1 | 3/2009 | Woo et al. |
| 2010/0123845 A1 | 5/2010 | Kim et al. |

FOREIGN PATENT DOCUMENTS

| | | |
|---|---|---|
| JP | 3656734 B | 3/2005 |
| KR | 10-2002-0002052 A | 9/2002 |

*Primary Examiner* — Phu Vu
(74) *Attorney, Agent, or Firm* — Cantor Colburn LLP

(57) ABSTRACT

A liquid crystal display includes a first substrate including a pixel area, a second substrate facing the first substrate, a liquid crystal layer interposed between the first substrate and the second substrate, and including liquid crystal molecules, a first electrode, a second electrode including a minute slit pattern, disposed on the first substrate and an insulating layer disposed between the first electrode and the second electrode, and a third electrode disposed on the second substrate. The pixel area includes a first region having a double-electrode structure wherein the first electrode and the second electrode overlap, and a second region having a single electrode structure including the second electrode.

25 Claims, 12 Drawing Sheets

LIQUID CRYSTAL DISPLAY AND METHOD OF MANUFACTURING THE SAME

This application claims priority to Korean Patent Application No. 10-2010-0136967 filed on Dec. 28, 2010, and all the benefits accruing therefrom under 35 U.S.C. §119, the entire contents of which are incorporated herein by reference.

BACKGROUND OF THE INVENTION (a) Field of the Invention

The invention relates to a liquid crystal display and a method of manufacturing the same.

(b) Description of the Related Art

A liquid crystal display as one of flat panel display devices that are widely being used. The liquid crystal display includes two display panels where field generating electrodes such as a pixel electrode and a common electrode are formed, and a liquid crystal layer interposed therebetween.

The liquid crystal display generates an electric field in a liquid crystal layer by applying voltage to the field generating electrodes, to determine orientations of liquid crystal molecules of the liquid crystal layer and control polarization of incident light, thereby displaying an image.

The liquid crystal display also includes a switching element connected to each pixel electrode, and a plurality of signal lines including gate lines and data lines for applying the voltage to the pixel electrode by controlling the switching element.

Among the liquid crystal displays, a vertically aligned mode liquid crystal display in which a long axis of the liquid crystal molecules are arranged to be vertical to a display panel in the state in which an electric field is not applied, has been in the limelight due to a high contrast ratio and a wide reference viewing angle thereof.

The vertically aligned mode liquid crystal display can arrange liquid crystal molecules in diverse directions by using a fringe electric field, and transmittance may be reduced due to a horizontal electric field component in the fringe electric field.

Further, the vertically aligned mode liquid crystal display may have side visibility lower than front visibility. In order to solve the problem, one pixel is partitioned into two subpixels and voltages of two subpixels are adjusted to be different from each other to change transmittance. In this case, since the partitioned pixels should be implemented within a limited pixel, an aperture ratio is inevitably reduced due to a limit in design.

The above information disclosed in this Background section is only for enhancement of understanding of the background of the invention and therefore it may contain information that does not form the prior art that is already known in this country to a person of ordinary skill in the art.

BRIEF SUMMARY OF THE INVENTION

The invention has been made in an effort to provide a liquid crystal display having advantages of preventing decrease in transmittance due to a horizontal field component and decrease in an aperture ratio according to a pixel division.

An exemplary embodiment provides a liquid crystal display includes a first substrate including a pixel area, a second substrate facing the first substrate, a liquid crystal layer between the first substrate and the second electrode and including liquid crystal molecules, a first electrode on the first substrate, a second electrode on the first substrate and including a minute slit pattern, an insulating layer between the first substrate and the second substrate, and a third electrode on the second substrate. The pixel area includes a first region having a double-electrode structure where the first electrode and the second electrode overlap, and a second region having a single electrode structure including the second electrode.

In an exemplary embodiment, the liquid crystal molecules may include first liquid crystal molecules disposed in the first region, and second liquid crystal molecules disposed in the second region. In driving the liquid crystal display, a tilted angle of the first liquid crystal molecules may be different from the tilted angle of the second liquid crystal molecules.

In an exemplary embodiment, the first electrode and the third electrode may be a plate shape, that is, each including a continuous solid surface in a plan view.

In an exemplary embodiment, the liquid crystal display may further include an alignment layer disposed on at least one of the second electrode and the third electrode. At least one of the liquid crystal layer and the alignment layer may include an alignment aiding agent.

In an exemplary embodiment, at least one of the liquid crystal layer and the alignment layer have a pretilt. The pretilt may be formed by, when the voltage applied to the first electrode is a first voltage and, the voltage applied to the second electrode is a second voltage, exposing the at least one of the liquid crystal layer and the alignment layer to light while the first voltage and the second voltage are respectively applied, wherein the first voltage is lower than the second voltage.

In an exemplary embodiment, the first region includes a vertical electric field generated due to a difference between the first voltage and the third voltage, and the second region includes an electric field generated due to a difference between the second voltage and the third voltage.

In an exemplary embodiment, the first electrode receives a data voltage, and the second electrode receives a lower voltage than the data voltage, such that the liquid crystal display may be driven.

In an exemplary embodiment, the first electrode may be substantially symmetric in a first direction, and a second direction perpendicular to the first direction, in the plan view.

In an exemplary embodiment, the liquid crystal display may further include a gate line on the first substrate, a data line on the first substrate and crossing the gate line, a first thin film transistor and a second thin film transistor connected to the gate line and the data line, a third thin film transistor connected to the gate line and the second thin film transistor, and a reference voltage line connected to the third thin film transistor. The first electrode may be connected to the first thin film transistor, and the second electrode may be connected to the second thin film transistor.

In an exemplary embodiment, the first electrode and the second electrode may be electrically connected to each other. The first electrode may be connected to the first thin film transistor by a dummy pattern.

In an exemplary embodiment, the dummy pattern may be disposed at a same layer as the second electrode. An output terminal of the second thin film transistor may be connected to the second electrode and an input terminal of the third thin film transistor.

In an exemplary embodiment, the second electrode may include a cross stem including a horizontal stem and a vertical stem crossing the horizontal stem, and a plurality of minute branches extending from the cross stem.

The second electrode may include a plurality of regions in which the plurality of minute branches extend from the cross stem in different directions. A thickness of the insulating layer may be in the range of about 100 nanometers (nm) to 1500 nm.

Another exemplary embodiment provides a method of manufacturing a liquid crystal display. The method includes forming a first electrode on a first substrate, the first substrate including a pixel area, forming an insulating layer on the first electrode, forming a second electrode on the insulating layer and including a minute slit pattern, the insulating layer between the first electrode and the second electrode, forming a third electrode on a second substrate facing the first substrate, forming an alignment layer on at least one of the second electrode and the third electrode, assembling the first substrate and the second substrate, forming a liquid crystal layer between the first substrate and the second substrate, applying a first voltage to the first electrode and applying a second voltage larger than the first voltage to the second electrode, and irradiating light to the liquid crystal layer while the first voltage and the second voltage are respectively applied to the first electrode and the second electrode. The pixel area includes a first region having a double electrode structure by overlapping the first electrode and the second electrode, and a second region having a single electrode structure including the second electrode. At least one of the liquid crystal layer and the alignment layer includes an alignment aiding agent.

In an exemplary embodiment, the first electrode and the third electrode may be respectively formed in a plate shape, that is, each including a continuous solid surface in a plan view. The first electrode may be substantially symmetric in a first direction, and a second direction perpendicular to the first direction, in the plan view.

The method may further include forming a gate line disposed on the first substrate, forming a data line disposed on the first substrate and crossing the gate line, forming a first thin film transistor and a second thin film transistor connected to the gate line and the data line, forming a third thin film transistor connected to the gate line and the second thin film transistor, and forming a reference voltage line connected to the third thin film transistor. The first electrode may be connected to the first thin film transistor and the second electrode may be connected to the second thin film transistor.

Another exemplary embodiment provides a method of driving a liquid crystal display, the method including applying a first voltage to a first electrode, applying a second voltage lower than the first voltage to a second electrode, applying a third voltage to a third electrode, driving a first region of a pixel area by a vertical electric field generated due to a difference between the first voltage and the third voltage, and driving a second region of the pixel area by an electric field generated due to a difference between the second voltage and the third voltage. The liquid crystal display comprises a first substrate including the pixel area, a second substrate facing the first substrate, a liquid crystal layer between the first substrate and the second substrate, and including liquid crystal molecules, the first electrode on the first substrate, the second electrode on the first substrate and including a minute slit pattern, an insulating layer between the first electrode and the second electrode, the third electrode on the second substrate, wherein the first region includes the first electrode overlapped with the second electrode, and the second region includes the second electrode.

In an exemplary embodiment, the first electrode and the second electrode may be electrically connected to each other.

In an exemplary embodiment, the first electrode may be connected to the first thin film transistor by a dummy pattern. The dummy pattern may be formed at a same layer as the second electrode.

In an exemplary embodiment, an output terminal of the second thin film transistor may be connected to the second electrode and an input terminal of the third thin film transistor.

According to the exemplary embodiments, a high-speed response can be implemented while maximizing transmittance by using a minute slit electrode in the exposure of an electric field for forming a pretilt, and using a no-patterned electrode in actually driving the liquid crystal display.

Further, the exemplary embodiments achieve an effect in which a pixel is essentially divided by using a difference in transmittance efficiency without actually dividing the pixel in to two subpixels adjacent to each other, such that an aperture ratio can be improved.

BRIEF DESCRIPTION OF THE DRAWINGS

The above and other features of this disclosure will become more apparent by describing in further detail exemplary embodiments thereof with reference to the accompanying drawings, in which.

DETAILED DESCRIPTION OF THE INVENTION

Figure 1:
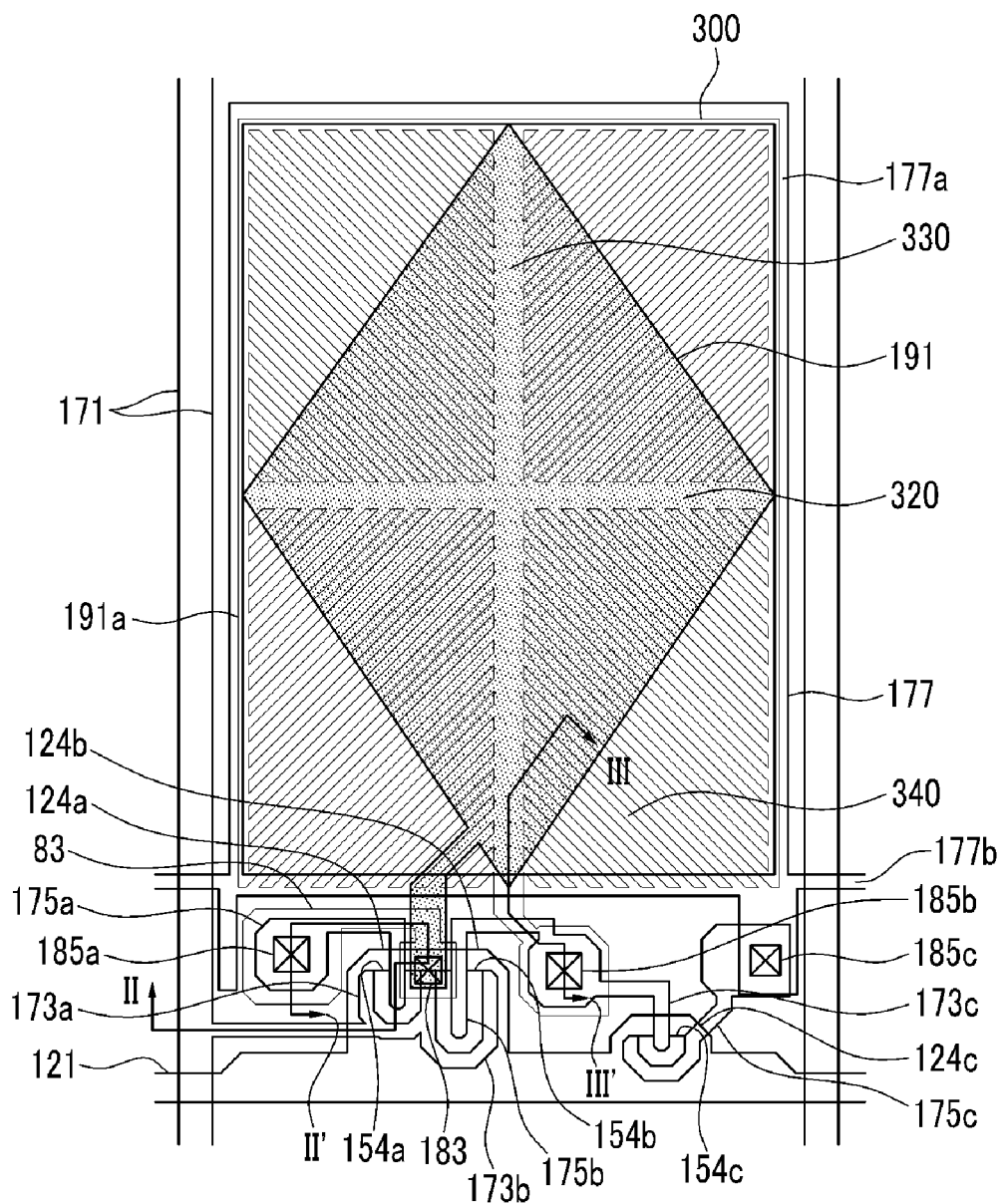
FIG. 1 is a plan view illustrating an exemplary embodiment of a liquid crystal display according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention. On the contrary, the embodiments introduced herein are provided to fully understand the disclosed contents and fully transfer the spirit of the invention to those skilled in the art. In the drawings, the thickness of layers, films, panels, regions, etc., are exaggerated for clarity.

In addition, in the case of when the layer is mentioned to be "on" or "connected to" another layer or substrate, it may be directly on the other layer or substrate or a third layer may be interposed between them. As used herein, "connected" includes physically and/or electrically connected. Like numbers refer to like elements throughout. Throughout the specification, like reference numerals refer to like elements. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "lower" relative to other elements or features would then be oriented "above" or "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

Figure 2:
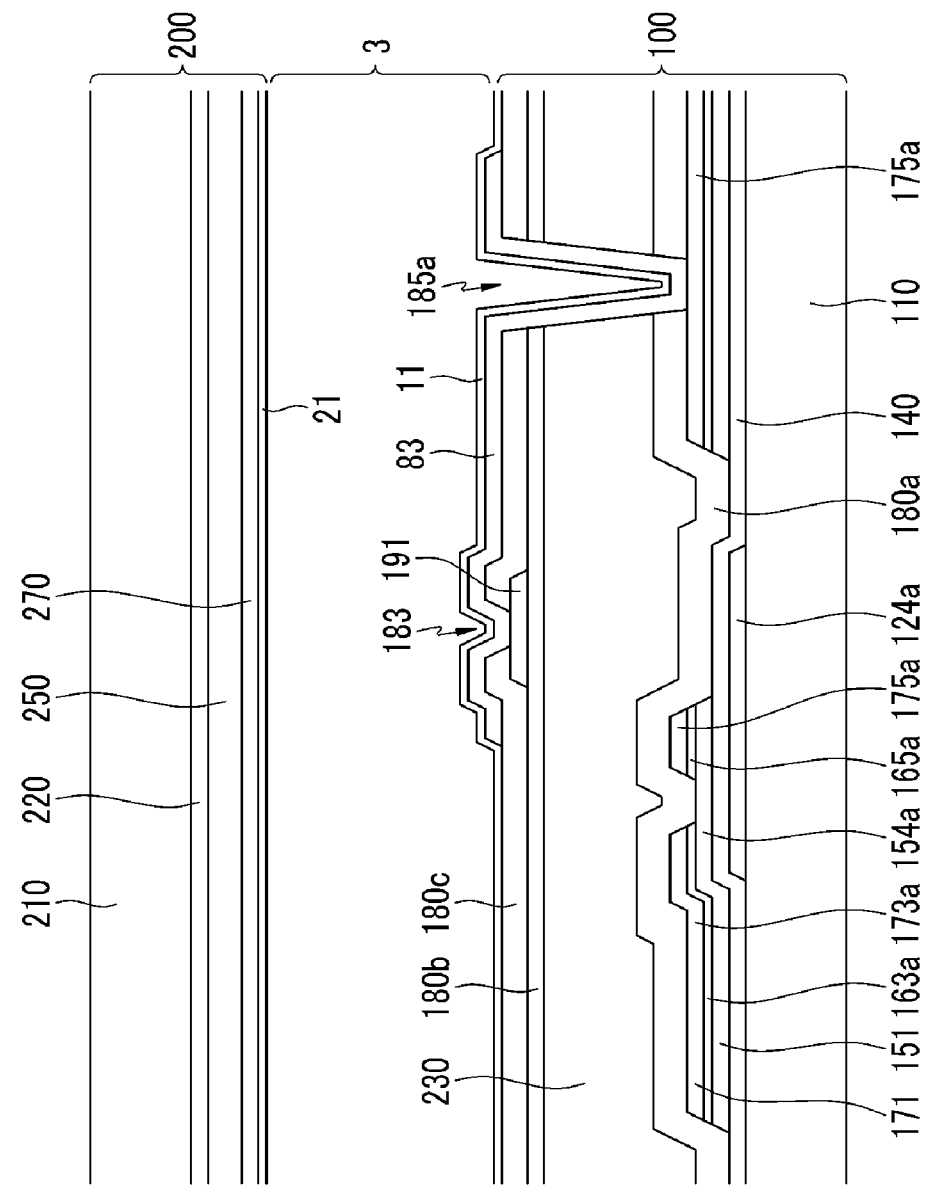
FIG. 2 is a cross-sectional view taken along line II-II' of FIG. 1

FIG. 1 is a plan view illustrating an exemplary embodiment of a liquid crystal display according to the invention. FIG. 2 is a cross-sectional view taken along line II-II' of FIG. 1 and FIG. 3 is a cross-sectional view taken along line III-III' of FIG. 1.

Figure 3:
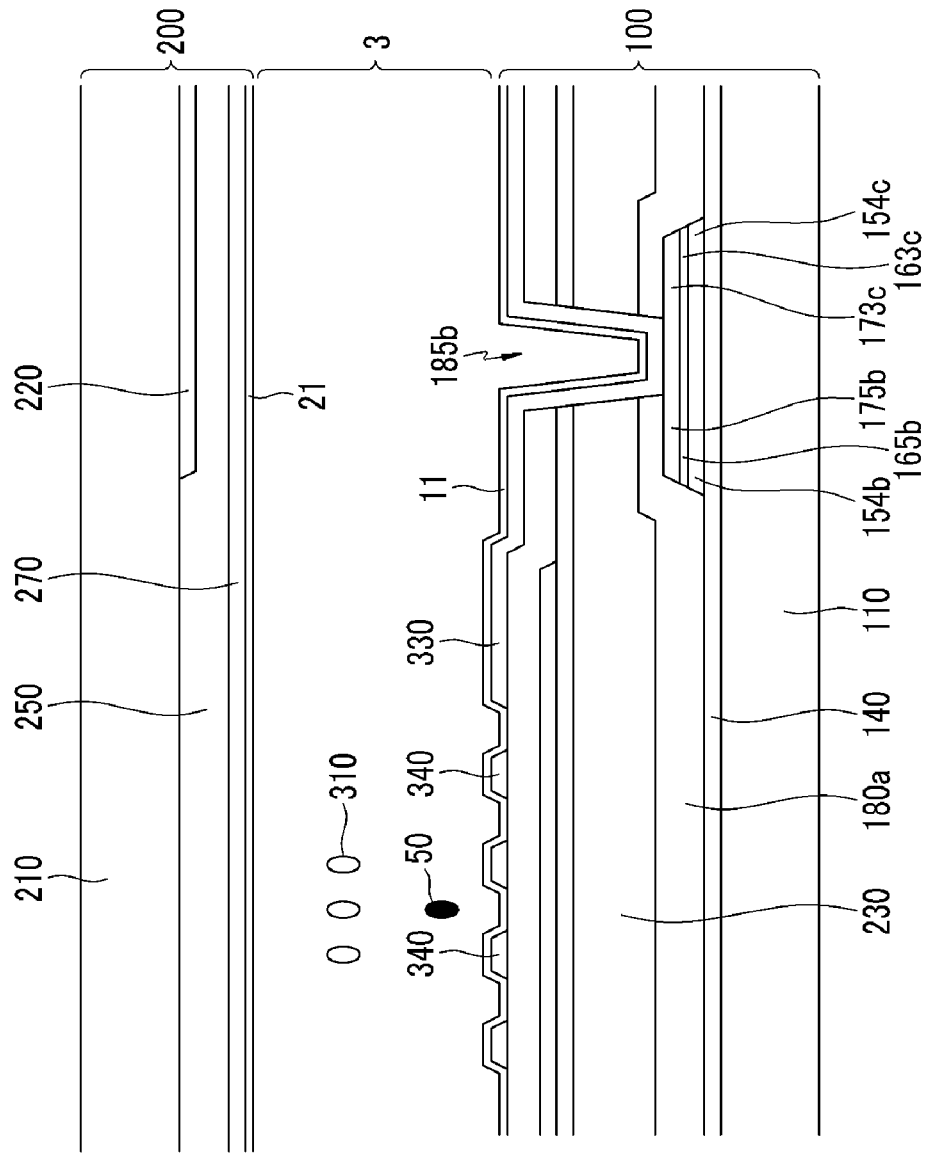
FIG. 3 is a cross-sectional view taken along line III-III' of FIG. 1.

Referring to FIGS. 1 to 3, the liquid crystal display includes a lower panel 100 and an upper panel 200 which face each other, a liquid crystal layer 3 including liquid crystal molecules 310 interposed between the panels 100 and 200, and a pair of polarizers (not shown) attached to the outside of the panels 100 and 200.

First, the upper panel 200 will be described.

The upper panel 200 corresponds to a second substrate, and a light blocking member 220 is on an upper substrate 210 having transparent and insulating properties. The light blocking member 220 is called a black matrix, and reduces or prevents the leakage of light between pixel electrodes 191 and 300 positioned in the lower panel 100 described later. The light blocking member 220 includes portions corresponding to a gate line 121 and a data line 171, and a portion corresponding to a thin film transistor.

The light blocking member 220 may be on a lower substrate 110 instead of the upper substrate 210.

A first overcoat 250 is on the light blocking member 220. The first overcoat 250 may include an insulating material, and provides a flat (e.g., planar) surface. In an alternative exemplary embodiment, the overcoat may be omitted.

A common electrode 270 corresponding to a third electrode is on the first overcoat 250. Herein, the common electrode 270 may be formed in a plate shape in a pixel area or unit pixel area. The plate shape indicates that the common electrode 270 has a continuous solid surface without divisions or splits.

Next, the lower panel 100 will be described.

A plurality of gate lines 121 are on the lower substrate 110 corresponding to a first substrate, and having an insulating property. The lower substrate 110 includes the pixel area, and may include a plurality of pixel areas. The gate line 121 transfers a gate signal and mainly extends in a horizontal (e.g., transverse) direction of the pixel area. The gate line 121 includes a first gate electrode 124a, a second gate electrode 124b, a third gate electrode 124c, and a wide end (not shown) for connection with other layers of the liquid crystal display and an external driving circuit. The gate line 121, the first gate electrode 124a, the second gate electrode 124b and the third gate electrode 124c collectively form a continuous, single, unitary, indivisible member.

A gate insulating layer 140 including an insulating material such as silicon nitride is on the gate line 121. A first semiconductor 154a, a second semiconductor 154b, and a third semiconductor 154c are on the gate insulating layer 140.

A plurality of ohmic contacts 163a, 165a, 165b and 163c are on the first semiconductor 154a, the second semiconductor 154b, and the third semiconductor 154c.

A plurality of data lines 171 includes a first source electrode 173a and a second source electrode 173b continuously extending therefrom, to form a single, unitary indivisible member. Data conductors 171, 173c, 175a, 175b, 175c, and 177 including the date line 171, the first source electrode 173a, the second source electrode 173b, a first drain electrode 175a, a second drain electrode 175b, a third source electrode 173c, a third drain electrode 175c, and a reference voltage line 177 are on the ohmic contacts 163a, 165a, 165b and 163c, and the gate insulating layer 140, respectively.

In an exemplary embodiment of forming the liquid crystal display, the data conductors, and the semiconductors and the ohmic contacts positioned therebelow, may be simultaneously formed by using one mask.

The data line 171 includes a wide end (not shown) for connection with other layers of the liquid crystal display and an external driving circuit (not shown).

The reference voltage line 177 includes two vertical portions 177a parallel to the data line 171, and a horizontal portion 177b connecting the two vertical portions 177a to each other. Delay of a signal flowing into the reference voltage line 177 can be reduced or effectively prevented by connecting the two vertical portions 177a of the reference voltage line 177, to the horizontal portion 177b.

The vertical portion 177a of the reference voltage line 177 is between the pixel electrodes 191 and 300, and the data line 171. The reference voltage line 177 is electrically connected to the third drain electrode 175c.

The horizontal portion 177b of the reference voltage line 177 is between the pixel electrodes 191 and 300, and the gate line 121. Accordingly, the reference voltage line 177 may reduce signal interferences between the pixel electrodes 191 and 300, and the data line 171, and between the pixel electrodes 191 and 300, and the gate line 121, respectively.

The first gate electrode 124a, the first source electrode 173a, and the first drain electrode 175a collectively form a first thin film transistor Qa (refer to FIG. 12) together with the first semiconductor 154a. A channel of the first thin film transistor Qa is on the semiconductor portion 154a between the first source electrode 173a and the first drain electrode 175a. Similarly, the second gate electrode 124b, the second source electrode 173b, and the second drain electrode 175b collectively form a second thin film transistor Qb (refer to FIG. 12) together with the second semiconductor 154b. A channel of the second thin film transistor Qb is on the semiconductor portion 154b between the second source electrode 173b and the second drain electrode 175b. Similarly, the third gate electrode 124c, the third source electrode 173c and the third drain electrode 175c collectively form a third thin film transistor Qc (refer to FIG. 12) together with the third semiconductor 154c. A channel of the third thin film transistor Qc is formed on the semiconductor portion 154c between the third source electrode 173c and the third drain electrode 175c.

A first passivation layer 180a is on the data conductors 171, 173c, 175a, 175b, 175c, and 177 and the exposed semiconductor portions 154a, 154b, and 154c. The first passivation layer 180a may include an inorganic insulating material such as silicon nitride and silicon oxide.

An organic layer 230 is on the first passivation layer 180a. The organic layer 230 includes a first contact hole 185a and a second contact hole 185b extended through a thickness thereof. The first contact hole 185a exposes the first drain electrode 175a and the second contact hole 185b exposes the second drain electrode 175b.

The organic layer 230 may provide a flat and planar surface, and may be a color filter. The organic layer 230 used as the color filter may elongate in a vertical (e.g., longitudinal) direction of the pixel area, and parallel to the pixel electrodes 191 and 300. Each color filter 230 may display one of three primary colors such as red, green, and blue. However, the color filter 230 is not limited to three primary colors such as red, green, and blue, and may display one color of cyan, magenta, yellow, and white-based colors.

A second overcoat 180b is on the organic layer 230. The second overcoat 180b may include an insulating material, reduces or effectively prevents the color filter 230 from being exposed and provides a flat surface. A first pixel electrode 191 is on the second overcoat 180b. The first pixel electrode 191 may include a transparent conductive material such as indium tin oxide ("ITO") or ("IZO"), or a reflective metal such as aluminum, silver, chromium, or an alloy thereof.

A second passivation 180c is on the first pixel electrode 191. A thickness of the second passivation 180c is in the range of about 100 nanometers (nm) to about 1500 nm. The second passivation layer 180c includes a dummy hole 183 extended through a thickness thereof and exposing the first pixel electrode 191. A dummy pattern 83 and a second pixel electrode 300 are on the second passivation layer 180c. The dummy pattern 83 is in the first contact hole 185a and the dummy hole 183, to thereby electrically connect the first drain electrode 175a and the first pixel electrode 191 to each other.

The second pixel electrode 300 is in most of the unit pixel area and includes a minute slit pattern. The second pixel electrode 300 including the minute slit pattern is in an overall quadrangle planar shape. The second pixel electrode 300 includes a cross stem constituted by a horizontal stem 320, and a vertical stem 330 crossing the horizontal stem 320. Further, the second pixel electrode 300 is divided into four subregions by the horizontal stem 320 and the vertical stem 330, and each subregion includes a plurality of minute branches 340.

One end of the vertical stem 330 of the second pixel electrode 300 is elongated so as to be electrically connected with the second drain electrode 175b through the second contact hole 185b.

The second pixel electrode 300 including the minute slit pattern will be described in detail.

As illustrated in the plan view of FIG. 1, one of the minute branches 340 of the second pixel electrode 300 extends obliquely in a top left direction from the horizontal stem 320 or the vertical stem 330, and another of the minute branches 340 extends obliquely in a top right direction from the horizontal stem 320 or the vertical stem 330. Further, another of the minute branches 340 extends obliquely in a lower left direction from the horizontal stem 320 or the vertical stem 330, and a remainder of minute branches 340 extends obliquely in a lower right direction from the horizontal stem 320 or the vertical stem 330. The extending direction of the minute branches 340 of two adjacent subregions may be perpendicular to each other. Although not shown, a width of the minute branch 340 may be gradually expanded in a direction towards or away from the horizontal stem 320 or the vertical stem 330, respectively.

The first pixel electrode 191 may be a substantially plate shape having a planar a rhombus shape in the unit pixel area as illustrated in FIG. 1. As described above, the plate shape indicates the rhombus has a continuous solid surface without divisions or splits. Since the first pixel electrode 191 has the rhombus shape, the first pixel electrode 191 may be at only a portion of the unit pixel area. However, the first pixel electrode 191 is not limited to the rhombus shape, and may be modified in various shape positioned at a portion of the unit pixel area so as to have a double electrode structure together with the second pixel electrode 300 as described below in detail. In this case, the shape of the first pixel electrode 191 may be horizontally and vertically symmetric.

In an exemplary embodiment, the unit pixel area may be a region crossing the gate line 121 and the data line 171, but is not necessarily limited thereto.

In detail, the pixel area is classified into a first region having a double-electrode structure where the first pixel electrode 191 and the second pixel electrode 300 overlap each other, and a second region excluding the first region and having a single electrode structure including the second pixel electrode 300. In driving the liquid crystal display, a tilted angle at which first liquid crystal molecules positioned in the first region are inclined is different from a tilted angle at which second liquid crystal molecules positioned in the second region are inclined. The tilted angles are different because the electric field generated in the first region is different from the electric field generated in the second region.

Alignment layers 11 and 21 are at the inside of each of the panels 100 and 200 and may be a vertical alignment layer.

Polarizers (not shown) are at the outside of the panels 100 and 200, and polarization axes of two polarizers are perpendicular to each other. In one exemplary embodiment, a polarization axis of one of the polarizers is parallel to the gate line 121. In the case of the reflective liquid crystal display, one of two polarizers may be omitted.

The liquid crystal layer 3 is interposed between the panels 100 and 200, and the liquid crystal molecules 310 included in the liquid crystal layer 3 may have a negative dielectric anisotropy. The liquid crystal molecules 310 of the liquid crystal layer 3 have a pretilt so that a long axis is approximately parallel to a longitudinal direction of the minute branch 340 of the second pixel electrode 300, and may be aligned so as to be perpendicular to the surfaces of the panels 100 and 200 while the electric field is not applied. Further, the liquid crystal layer 3 further includes an alignment aiding agent 50 including reactive mesogen, and the liquid crystal molecules 310 may have a pretilt so that the long axis thereof is approximately parallel to the longitudinal direction of the minute branch 340 of the second pixel electrode 300 by the alignment aiding agent 50.

In another exemplary embodiment of the invention, the alignment aiding agent 50 may be included in the alignment layers 11 and 21 instead of the liquid crystal layer 3. In this case, the alignment layers 11 and 21 include a main-chain and a side-chain, and the alignment aiding agent 50 is connected to the side-chain and may be electrically negative. Consequently, the alignment layers 11 and 21 may have a pretilt by using the alignment aiding agent 50

Figure 4:
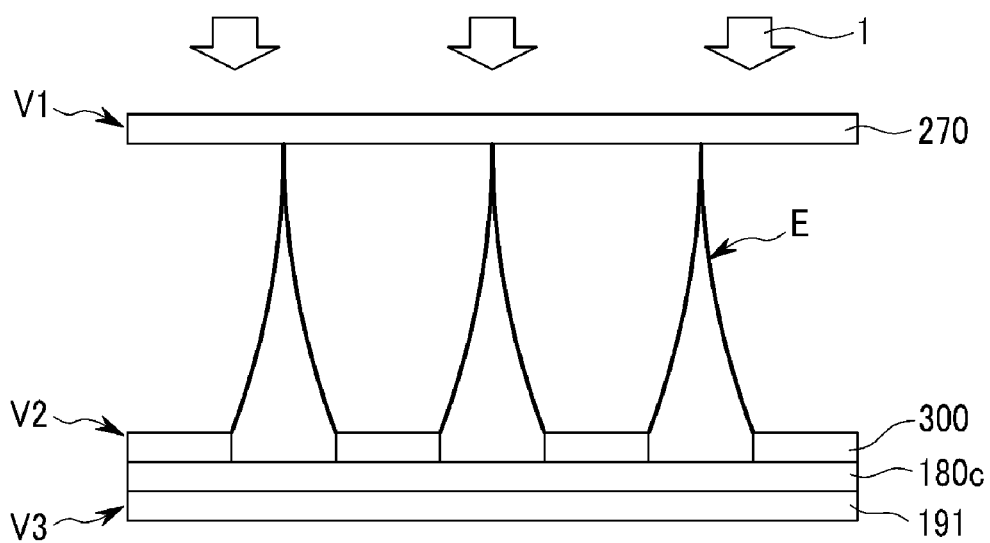
FIG. 4 is a schematic cross-sectional view illustrating an exemplary embodiment of process in the manufacturing of a liquid crystal display, showing an electric field direction in electric field exposure.

Hereinafter, an exemplary embodiment of a method of manufacturing a liquid crystal display according to the invention will be described with reference to FIGS. 1 to 4. FIG. 4 is a schematic cross-sectional view illustrating an electric field direction in electric field exposure in the exemplary embodiment of FIG. 1.

Referring to FIGS. 1 to 3, the lower panel 100 and the upper panel 200 are manufactured, respectively.

The upper panel 200 is manufactured by a method as described below.

The light blocking member 220 is formed on the upper substrate 210 and then the first overcoat 250 is formed thereon. The common electrode 270 is formed on the first overcoat 250. The alignment layer 21 is formed on the common electrode 270.

The lower panel 100 is manufactured by a method as described below.

The gate line 121 including first to third gate electrodes 124a, 124b, and 124c, the gate insulating layer 140, semiconductor layers 151, 154a, 154b, and 154c, the data line 171 including first to third source electrodes 173a, 173b, and 173c, first to third drain electrodes 175a, 175b, and 175c, and the first passivation layer 180a are sequentially formed by stacking and patterning a plurality of thin films on the lower substrate 110.

The organic layer 230 is formed on the first passivation layer 180a.

The second overcoat 180b is formed on the organic layer 230. A conductive layer such as ITO or IZO is stacked and patterned on the second overcoat 180b to form the first pixel electrode 191 which is at a portion of a unit pixel area and has a substantially plate shape. Subsequently, a second passivation layer 180c is formed on the first pixel electrode 191.

The first contact hole 185a exposing the first drain electrode 175a, the second contact hole 185b exposing the second drain electrode 175b, a third contact hole 185c exposing the third drain electrode 175c, and a dummy hole 183 exposing the first pixel electrode 191 are formed by pattering the second passivation layer 180c.

The dummy pattern 83 and the second pixel electrode 300 which electrically connect the first drain electrode 175a and the first pixel electrode 191, are formed by stacking and patterning the conductive layer such as ITO or IZO on the second passivation layer 180c. Thereafter, the alignment layer 11 is coated on the second pixel electrode 300.

Next, the liquid crystal layer 3 is formed by assembling the lower panel 100 and the upper panel 200 manufactured by the method as described above, and injecting a mixture of the liquid crystal molecules 310 and the alignment aiding agent 50 therebetween. However, the liquid crystal layer 3 may be formed by dropping the mixture of the liquid crystal molecules 310 and the alignment aiding agent 50 on the lower panel 100 or the upper panel 200. In the exemplary embodiment, the alignment aiding agent 50 is included in the liquid crystal layer 3, but in another exemplary embodiment, the alignment aiding agent 50 may be formed so as to be included in alignment layers 11 and 21 rather than the liquid crystal layer 3.

Next, referring to FIG. 4, voltages are applied to the first pixel electrode 191 and the second pixel electrode 300. Assuming that the voltage applied to the common electrode 270 is a first voltage V1, the voltage applied to the second pixel electrode 300 is a second voltage V2, and the voltage applied to the first pixel electrode 191 is a third voltage V3, the voltages are applied to the first pixel electrode 191 and the second pixel electrode 300 so as to make the third voltage V3 have voltage lower than the second voltage V2. The first voltage V1 may be zero.

That is, a fringe field E is formed by applying the second voltage V2 larger than the third voltage V3 with respect to the first voltage V1. The liquid crystal molecules 310 incline toward the outside of the pixel area by the generated fringe field. In detail, since only a strong fringe field is present at a non-electrode portion between the minute branches 340 of the second pixel electrode 300, the liquid crystal molecules 310 are aligned in a predetermined direction. A final domain direction of an entire of the liquid crystal molecules is determined by elastic energy between the liquid crystal molecules 310 which incline in a predetermined direction by the vertical field of the minute branches 340.

Next, light 1 is irradiated to the liquid crystal display while the fringe field E shown in FIG. 4 is formed. Accordingly, the liquid crystal molecules 310 may have the pretilt.

A structure of a final liquid crystal display including the pretilt may be formed by exposing the liquid crystal layer 3 or the alignment layers 11 or 21 to light while applying voltages to the pixel electrodes as described above, during an exposure process. The pretilt of the liquid crystal layer 3 or the alignment layers 11 or 21 is considered a distinct structural characteristic of the final liquid crystal display. Since the pretilt is imparted by exposing the liquid crystal layer 3 or the alignment layers 11 or 21 to light while applying voltages to the pixel electrodes as described above, is considered to impart the distinct structural characteristic of the pretilt of the liquid crystal layer 3 or the alignment layers 11 or 21.

Figure 5:
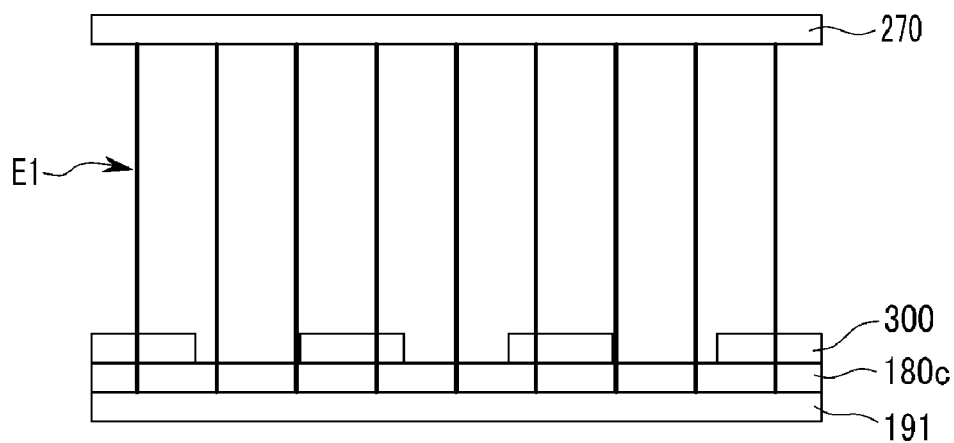
FIG. 5 is a schematic cross-sectional view illustrating an exemplary embodiment of an electric field direction in driving the liquid crystal display manufactured in FIG. 4.

FIG. 5 is a schematic cross-sectional view illustrating an exemplary embodiment of an electric field direction in driving the liquid crystal display manufactured in FIG. 4.

Referring to FIG. 5, the liquid crystal display manufactured in FIG. 4 may be driven under the condition as described below. The third voltage V3 applied to the first pixel electrode 191 is a data voltage applied through the data line 171, and the second voltage V2 applied to the second pixel electrode 300 is a voltage lower than the third voltage V3. A common voltage Vcom having a constant magnitude is applied to the common electrode 270. Accordingly, the liquid crystal molecules 310 may move by the vertical field E1 generated between the common electrode 270 and the first pixel electrode 191.

Therefore, since the liquid crystal molecules in most of the first region of the pixel area move only by the vertical field in driving the liquid crystal display, reduction in transmittance due to the horizontal field can be minimized and a high-speed response can be implemented. In addition, since only the second pixel electrode 300 having the minute slit pattern is positioned in the second region of the pixel area unlike the first region, the second region is affected by an electric field different from the first region of the pixel area. Accordingly, visibility can be improved by showing the same effect as dividing the pixel.

Figure 6:
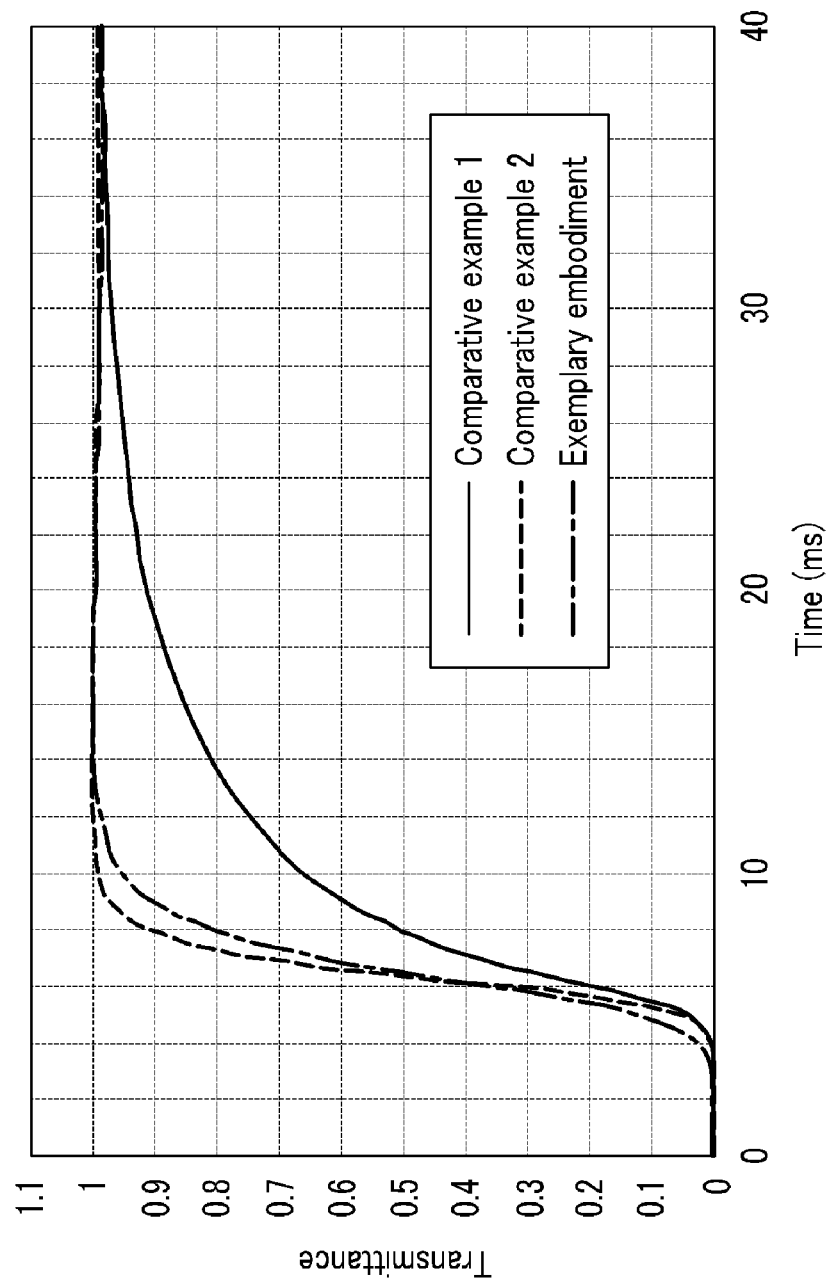
FIG. 6 is a graph comparing response characteristics of an exemplary embodiment of the invention, and comparative examples, according to a structure of a lower electrode.

FIG. 6 is a graph comparing response characteristics of an exemplary embodiment of the invention, and comparative examples, according to a structure of a lower electrode.

Comparative example 1 shown in FIG. 6 corresponds to a liquid crystal display of an overall double-electrode structure including a common electrode at an upper substrate and a pixel electrode having a minute slit pattern at a lower substrate. Comparative example 2 corresponds to the liquid crystal display of an overall double-electrode structure including the common electrode at the upper substrate and the pixel electrode having a plate shape at the lower substrate. The exemplary embodiment of the invention corresponds to the liquid crystal display of an overall triple-electrode structure including the common electrode at the upper substrate, and a first pixel electrode having a plate shape and a second pixel electrode having a minute slit pattern at the lower substrate, with an insulating layer interposed therebetween.

Referring to FIG. 6, with respect to the response characteristic, the exemplary embodiment of the invention is worse than comparative example 2, but is better than comparative example 1. Although the exemplary embodiment is worse than comparative example 2 with respect to the response speed, in the case of than comparative example 2, it is difficult to efficiently control a reclining direction of the liquid crystal because the pixel electrode formed at the lower substrate has a plate shape. Accordingly, the transmittance is reduced.

The liquid crystal display according to the exemplary embodiment of the invention is improved with respect to the response speed as compared with the structure of the pixel electrode having the minute slit pattern in the related art, and is excellent with respect to the transmittance.

Figure 7:
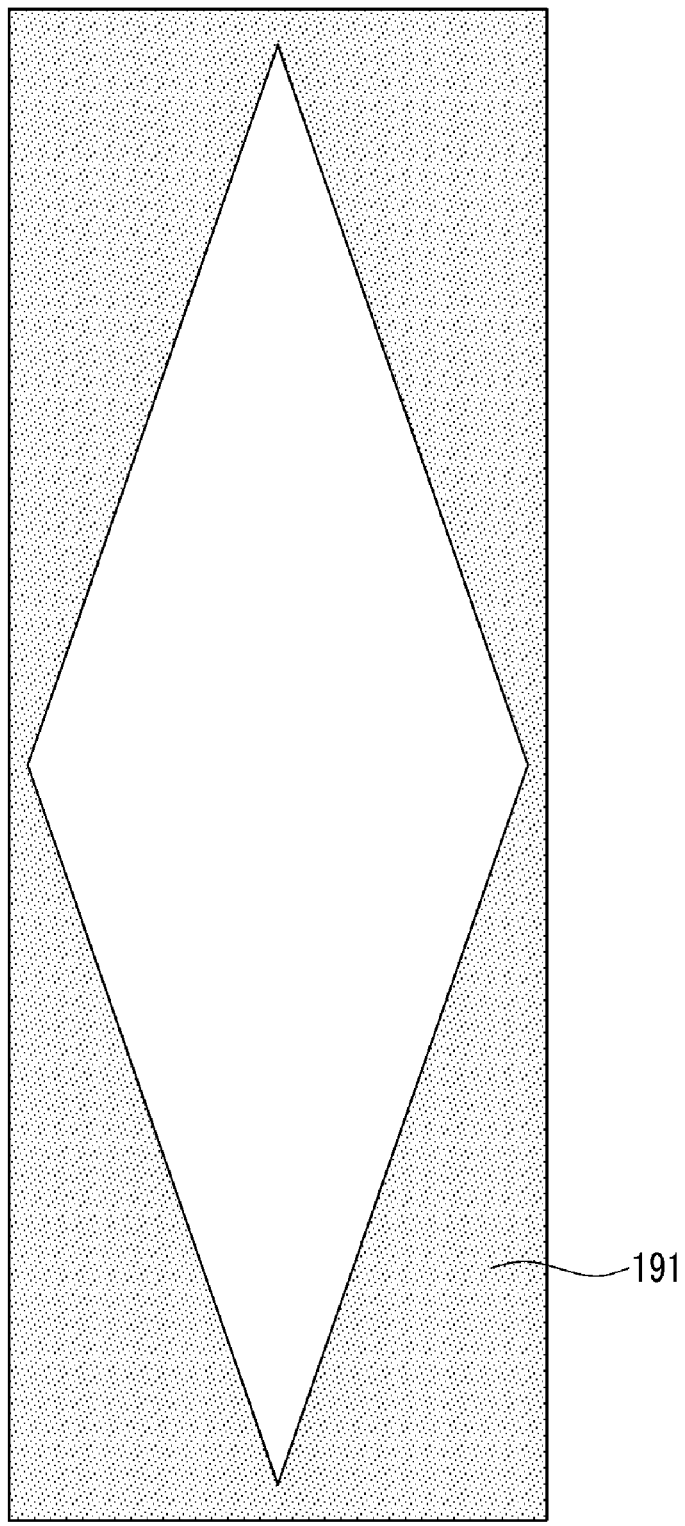
FIG. 7 is a schematic plan view illustrating another exemplary embodiment of a structure of a pixel electrode according to the invention.

FIG. 7 is a schematic plan view illustrating another exemplary embodiment of a structure of a pixel electrode according to the invention.

Referring to FIG. 7, the first pixel electrode is extended to an edge of the rectangle shape, unlike the first pixel electrode 191 of the exemplary embodiment shown in FIG. 1. Material of the first pixel electrode 191 is absent at the middle of the rectangle. In other words, a layout of the first region and the second region of the pixel area shown in FIG. 1 is opposite to the layout described in FIG. 1.

Figure 8:
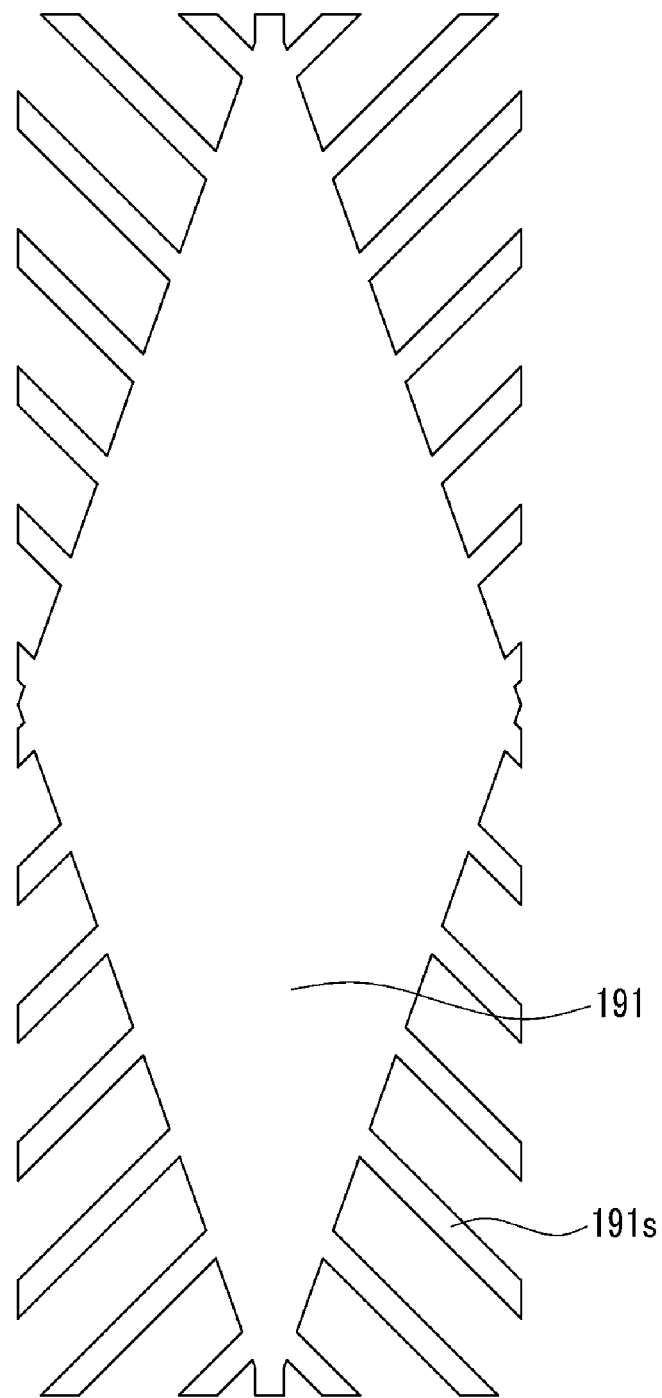
FIGS. 8 and 9 are schematic plan views illustrating another exemplary embodiment of a structure of first and second pixel electrodes according to the invention.
Figure 9:
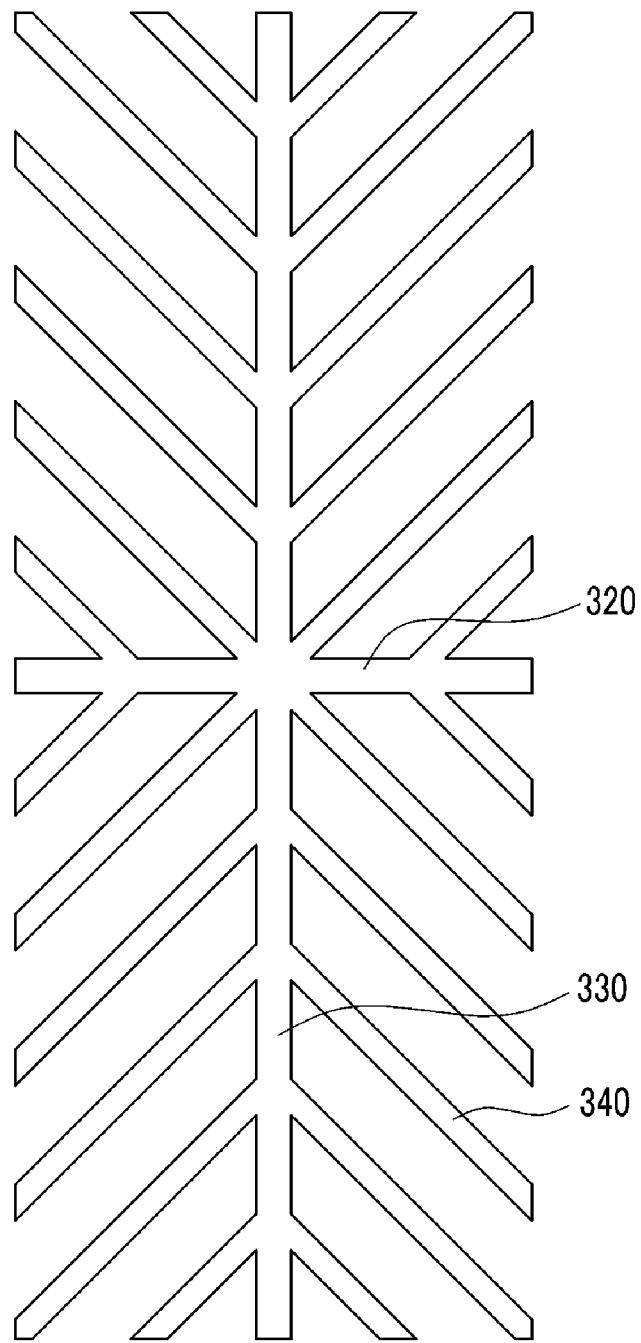

FIGS. 8 and 9 are schematic plan views illustrating another exemplary embodiment of a structure of first and second pixel electrodes according to the invention.

Referring to FIGS. 8 and 9, a first pixel electrode 191 further includes branches 191s protruding from an edge side of the first pixel electrode 191 shown in FIG. 1. In addition, the second pixel electrode 300 in the exemplary embodiment has a similar shape to the second pixel electrode 300 of the exemplary embodiment shown in FIG. 1, but has a relatively wide interval between a plurality of minute branches 340. In the exemplary embodiment, the plurality of minute branches 340 may be between the branches 191s of the first pixel electrode 191.

Figure 10:
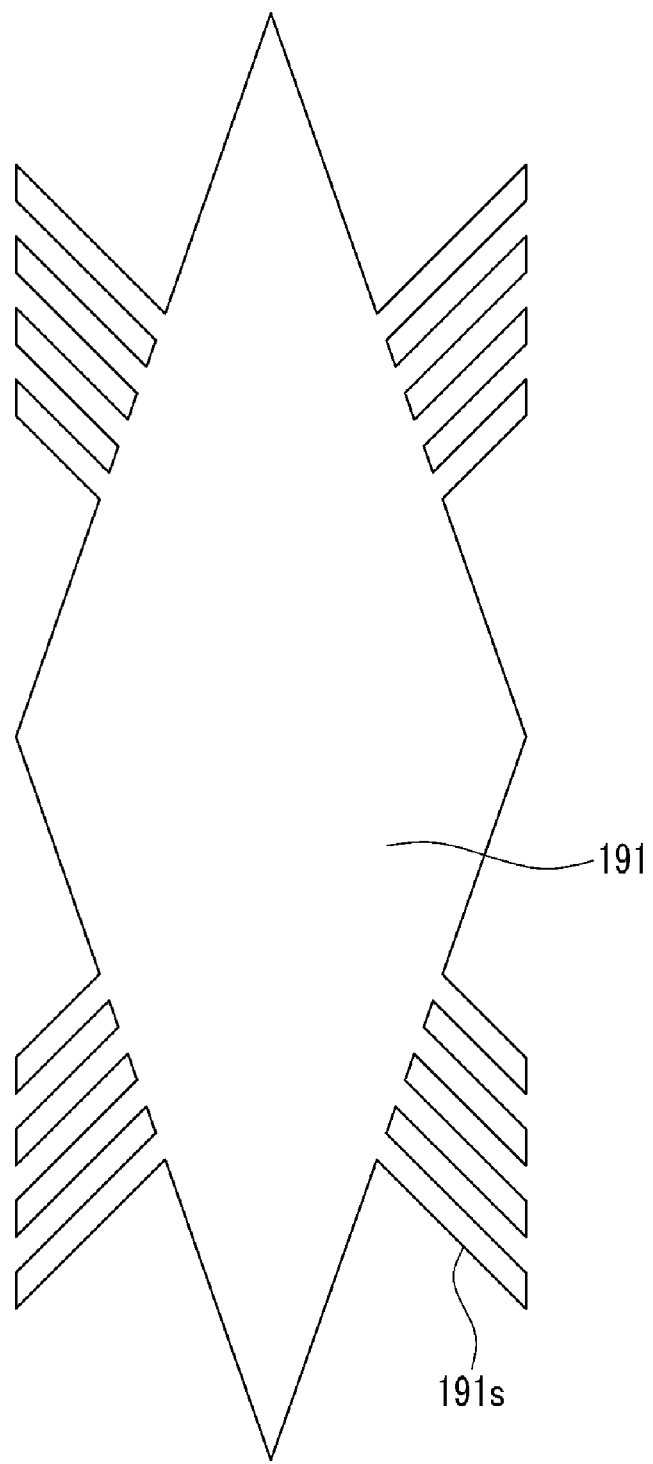
FIGS. 10 and 11 are schematic plan views illustrating still another exemplary embodiment of a structure of first and second pixel electrodes according to the invention.
Figure 11:
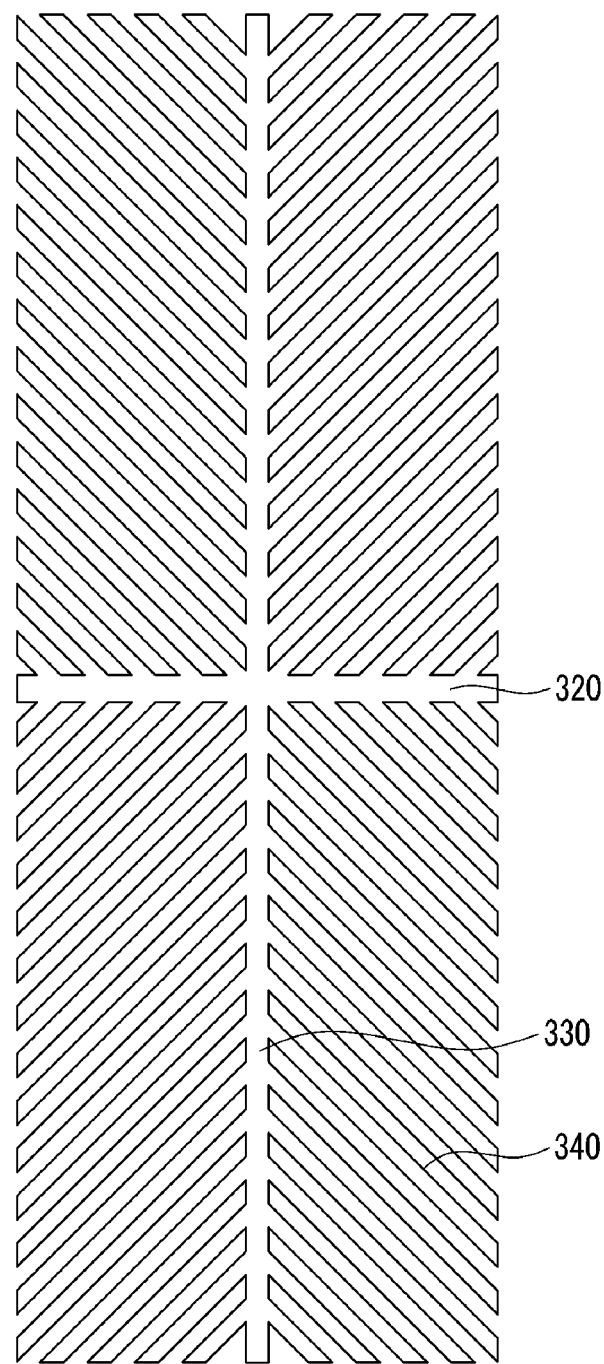

FIGS. 10 and 11 are schematic plan views illustrating still another exemplary embodiment of a structure of first and second pixel electrodes according to the invention.

Referring to FIGS. 10 and 11, a first pixel electrode 191 further includes the branch 191s protruding from the center of each side of the rhombus shape. In the liquid crystal display according to the exemplary embodiment, a total of twelve domains defined according to an aligned direction and an inclined angel of the liquid crystal molecules may be included. In the exemplary embodiment shown in FIGS. 7 to 9, total eight domains may be included.

The features and the disclosure of the exemplary embodiment shown in FIGS. 1 to 3 may be applied to the exemplary embodiment shown in FIGS. 7 to 11, except for the portion described above.

The structure of the pixel electrode, that is, the first pixel electrode 191 and the second pixel electrode 300 both positioned at the lower substrate 100 described with reference to FIGS. 7 to 11 are just exemplary embodiments thereof, and the shapes of the first pixel electrode 191 and the second pixel electrode 300 may be variously modified.

Figure 12:
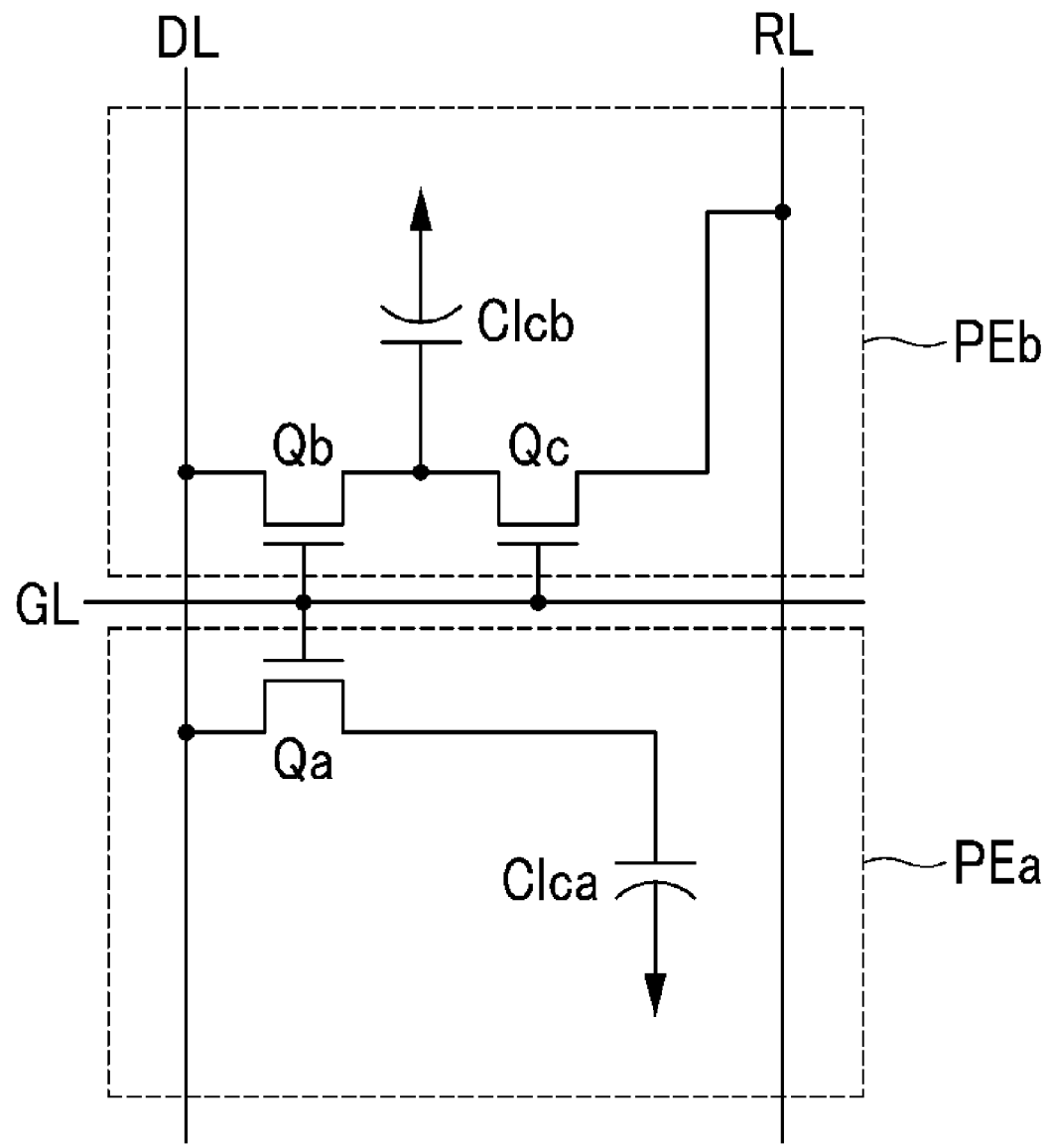
FIG. 12 is an equivalent circuit diagram of an exemplary embodiment of one pixel of the liquid crystal display of FIG. 1.
Figure 13:
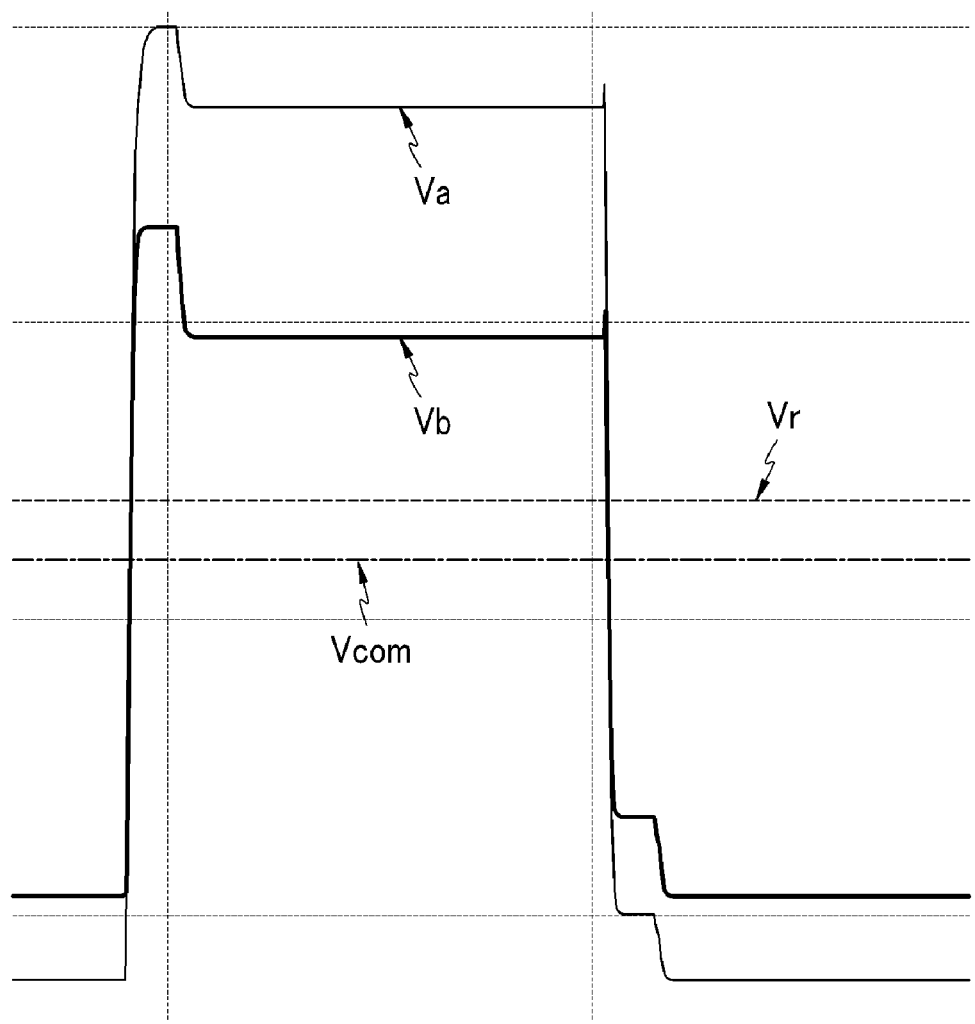
FIG. 13 is a waveform diagram of an exemplary embodiment of a signal applied to the pixel of the liquid crystal display of FIG. 1.

Hereinafter, an exemplary embodiment of a layout of a signal line and a pixel of the liquid crystal display of the invention, and a driving method thereof will be described with reference to FIGS. 12 and 13. FIG. 12 is an equivalent circuit diagram for one pixel of the liquid crystal display of FIG. 1. FIG. 13 is a waveform diagram of a signal applied to the pixel of the liquid crystal display of FIG. 1.

Referring to FIG. 12, one pixel of the liquid crystal display of the invention includes a plurality of signal lines including a gate line GL transmitting a gate signal, a data line DL transmitting a data signal and a reference voltage line RL transmitting a divided reference voltage Vr, and a first switching element Qa, a second switching element Qb, a third switching element Qc, a first liquid crystal capacitor Clca, and a second liquid crystal capacitor Clcb which are connected to the plurality of signal lines.

The first switching element Qa and the second switching element Qb are respectively connected to a same one of the gate lines GL and a same one the data line DL. The third switching element Qc is connected to an output terminal of the second switching element Qb and the reference voltage line RL.

The first switching element Qa and the second switching element Qb are three-terminal elements of a thin film transistor. Control terminals thereof are connected to the same one gate line GL, input terminals are connected to the same one data line DL, an output terminal of the first switching element Qa is connected to the first liquid crystal capacitor Clca, and an output terminal of the second switching element Qb is connected to input terminals of the second liquid crystal capacitor Clcb and the third switching element Qc.

The third switching element Qc is also a three-terminal element of the thin film transistor. A control terminal thereof is connected to the gate line GL, an input terminal is connected to the second liquid crystal capacitor Clcb, and an output terminal is connected to the reference voltage line RL.

Referring to FIG. 13, when a gate on Von signal is applied to the gate line GL, the first switching element Qa, the second switching element Qb, and the third switching element Qc which are connected thereto are turned on. Accordingly, the data voltage applied to the data line DL is respectively applied to a first electrode PEa and a second electrode PEb through the respective first switching element Qa and the second switching element Qb which are turned on. In this case, the data voltages applied to the first electrode PEa and the second electrode PEb may be charged at the same value as each other. However, in the exemplary embodiment of the invention, the voltage applied to the second electrode PEb is divided through the third switching element Qc connected with the second switching element Qb in series. Accordingly, a voltage Vb applied to the second electrode PEb is smaller than a voltage Va applied to the first electrode PEa.

Finally, a voltage charged to the first liquid crystal capacitor Clca is different from a voltage charged to the second liquid crystal capacitor Clcb. Since the voltage charged to the first liquid crystal capacitor Clca is different from the voltage charged to the second liquid crystal capacitor Clcb, inclined angles of the liquid crystal molecules in the first region and the second region of the pixel area are different, such that luminance in two regions is different. Therefore, an image viewed from the side can be maximally close to an image viewed from the front by properly adjusting the voltage charged to the first liquid crystal capacitor Clca and the voltage charged to the second liquid crystal capacitor Clcb such that side visibility can be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A liquid crystal display, comprising:
a first substrate including a pixel area;
a second substrate facing the first substrate;
a liquid crystal layer interposed between the first substrate and the second substrate, and including liquid crystal molecules;
a first electrode, and a second electrode including a minute slit pattern, on the first substrate;
an insulating layer between the first electrode and the second electrode; and
a third electrode on the second substrate,
wherein the pixel area includes:
a first region having a double-electrode structure where the first electrode and the second electrode overlap, and
a second region having a single electrode structure including the second electrode.
2. The liquid crystal display of claim 1, wherein:
the liquid crystal molecules include first liquid crystal molecules in the first region and second liquid crystal molecules in the second region, and
a tilted angle of the first liquid crystal molecules is different from a tilted angle of the second liquid crystal molecules when the liquid crystal display is driven.
3. The liquid crystal display of claim 2, wherein:
the first electrode and the third electrode each including a continuous solid surface in a plan view.
4. The liquid crystal display of claim 3, further comprising:
an alignment layer on at least one of the second electrode and the third electrode, and
wherein at least one of the liquid crystal layer and the alignment layer includes an alignment aiding agent.
5. The liquid crystal display of claim 4, wherein:
the at least one of the liquid crystal layer and the alignment layer has a pretilt; and
the pretilt is formed by:
when the voltage applied to the first electrode is a first voltage and, the voltage applied to the second electrode is a second voltage, exposing the at least one of the liquid crystal layer and the alignment layer to light while the first voltage and the second voltage are respectively applied,
wherein the first voltage is lower than the second voltage.
6. The liquid crystal display of claim 5, wherein:
the first region includes a vertical electric field generated due to a difference between the first voltage and the third voltage, and
the second region includes an electric field generated due to a difference between the second voltage and the third voltage.
7. The liquid crystal display of claim 6, wherein:
the first electrode receives a data voltage, and the second electrode receives a lower voltage than the data voltage, such that the liquid crystal display is driven.
8. The liquid crystal display of claim 3, wherein:
the first electrode is substantially symmetric in a first direction, and a second direction perpendicular to the first direction, in the plan view.
9. The liquid crystal display of claim 1, further comprising:
a gate line on the first substrate;
a data line on the first substrate and crossing the gate line;
a first thin film transistor and a second thin film transistor connected to the gate line and the data line;
a third thin film transistor connected to the gate line and the second thin film transistor; and
a reference voltage line connected to the third thin film transistor,
wherein the first electrode is connected to the first thin film transistor, and the second electrode is connected to the second thin film transistor.
10. The liquid crystal display of claim 9, wherein:
the first electrode and the second electrode are electrically connected to each other.
11. The liquid crystal display of claim 10, wherein:
the first electrode is connected to the first thin film transistor by a dummy pattern.
12. The liquid crystal display of claim 11, wherein:
the dummy pattern is disposed at a same layer as the second electrode.
13. The liquid crystal display of claim 9, wherein:
an output terminal of the second thin film transistor is connected to the second electrode and an input terminal of the third thin film transistor.
14. The liquid crystal display of claim 1, wherein:
the second electrode includes a cross stem including a horizontal stem, and a vertical stem crossing the horizontal stem and a plurality of minute branches extending from the cross stem.

15. The liquid crystal display of claim 14, wherein:
the second electrode includes a plurality of regions in which the plurality of minute branches extend from the cross stem in different directions.

16. The liquid crystal display of claim 1, wherein:
a thickness of the insulating layer is in a range of about 100 nanometers to 1500 nanometers.

17. A method of manufacturing a liquid crystal display, the method comprising:
forming a first electrode on a first substrate, the first substrate including a pixel area;
forming an insulating layer on the first electrode;
forming a second electrode on the insulating layer and including a minute slit pattern, the insulating layer between the first electrode and the second electrode;
forming a third electrode on a second substrate facing the first substrate;
forming an alignment layer on at least one of the second electrode and the third electrode;
assembling the first substrate and the second substrate;
forming a liquid crystal layer between the first substrate and the second substrate;
applying a first voltage to the first electrode, and applying a second voltage larger than the first voltage to the second electrode; and
irradiating light to the liquid crystal layer while the first voltage and the second voltage are respectively applied to the first electrode and the second electrode,
wherein the pixel area includes a first region having a double-electrode structure by overlapping the first electrode and the second electrode, and a second region having a single electrode structure including the second electrode, and
at least one of the liquid crystal layer and the alignment layer includes an alignment aiding agent.

18. The method of claim 17, wherein:
the first electrode and the third electrode each including a continuous solid surface in a plan view.

19. The method of claim 18, wherein:
the first electrode is substantially symmetric in a first direction, and a second direction perpendicular to the first direction, in the plan view.

20. The method of claim 17, further comprising:
forming a gate line disposed on the first substrate;
forming a data line disposed on the first substrate and crossing the gate line;
forming a first thin film transistor and a second thin film transistor connected to the gate line and the data line;
forming a third thin film transistor connected to the gate line and the second thin film transistor; and
forming a reference voltage line connected to the third thin film transistor,
wherein the first electrode is connected to the first thin film transistor and the second electrode is connected to the second thin film transistor.

21. The method of claim 20, wherein:
the first electrode and the second electrode are electrically connected to each other.

22. The method of claim 21, wherein:
the first electrode is connected to the first thin film transistor by a dummy pattern.

23. The method of claim 22, wherein:
the dummy pattern is formed at a same layer as the second electrode.

24. The method of claim 20, wherein:
an output terminal of the second thin film transistor is connected to the second electrode and an input terminal of the third thin film transistor.

25. A method of driving a liquid crystal display, the method including:
applying a first voltage to a first electrode;
applying a second voltage lower than the first voltage to a second electrode;
applying a third voltage to a third electrode;
driving a first region of a pixel area by a vertical electric field generated due to a difference between the first voltage and the third voltage, and
driving a second region of the pixel area by an electric field generated due to a difference between the second voltage and the third voltage;
wherein the liquid crystal display comprises:
a first substrate including the pixel area;
a second substrate facing the first substrate:
a liquid crystal layer between the first substrate and the second substrate, and including liquid crystal molecules;
the first electrode on the first substrate;
the second electrode on the first substrate and including a minute slit pattern;
an insulating layer between the first electrode and the second electrode;
the third electrode on the second substrate;
wherein:
the first region includes the first electrode overlapped with the second electrode, and
the second region includes the second electrode.

* * * * *